United States Patent [19]

Aiken, Jr. et al.

[11] 4,402,058
[45] Aug. 30, 1983

[54] KEYBOARD MISMATCH CORRECTION

[75] Inventors: John A. Aiken, Jr., Round Rock; Kenneth O. Shipp, Jr., Austin, both of Tex.

[73] Assignee: International Business Machines Corporation, Armonk, N.Y.

[21] Appl. No.: 208,788

[22] Filed: Nov. 20, 1980

[51] Int. Cl.³ .............................................. G06F 3/14
[52] U.S. Cl. ................... 364/900; 340/709; 340/711
[58] Field of Search .......... 364/200, 900; 340/750, 340/709, 711

[56] References Cited

U.S. PATENT DOCUMENTS

| | | | |
|---|---|---|---|
| 3,618,032 | 11/1971 | Goldsberry et al. | 340/711 |
| 3,654,611 | 4/1972 | Bluethman et al. | 364/200 |
| 3,675,208 | 7/1972 | Bard | 340/709 |
| 3,980,994 | 9/1976 | Ying et al. | 364/200 |
| 4,041,467 | 8/1977 | Cota et al. | 364/900 |
| 4,110,823 | 8/1978 | Cronshaw et al. | 364/200 |
| 4,189,727 | 2/1980 | Vaughn, Jr. | 340/750 |
| 4,190,835 | 2/1980 | Buynak | 340/711 |

*Primary Examiner*—Gary Chin
*Attorney, Agent, or Firm*—Harold E. Meier

[57] ABSTRACT

In a word processor where a text stream is input by way of a keyboard for storage and is displayed to an operator and wherein different keyboard character sets are available, means are provided for signalling the location at which an insert of one or more characters is to be added to the text stream. Means are provided for comparing the active keyboard character set in the text stream immediately preceding the location to the keyboard character set of the insert to produce a first output when the keyboard character sets compare and a second output when the keyboard character sets do not compare. The insert is entered into the text stream at the location upon generation of the first output. Upon generation of the second output a character set change code is added immediately upstream of said location to indicate the keyboard character set for the insert. Immediately following the insert a character set change code is added to indicate the keyboard character set for the text shown immediately following the insert.

5 Claims, 4 Drawing Figures

KEYBOARD MISMATCH CORRECTION

CROSS-REFERENCE TO RELATED APPLICATION

U.S. patent application Ser. No. 208,784, filed Nov. 20, 1980, entitled "Text Keyboard Mismatch Operation", and having John A. Aiken, Jr. as inventor.

BACKGROUND OF THE INVENTION

1. Field of the Invention

This invention relates to the correction of keyboard input text as stored for display or hard copy printing, and more particularly, to the selection from among multiple keyboard character sets for correct matching.

2. Description of Prior Art

Prior art relating to the present invention includes:

(a) Key-to-display systems such as IBM OS/6 System in which an 8-bit extension of the 7-bit magnetic card code was utilized wherein a keyboard number for a document was saved in a document master format and was made operator-selectable. For multi-line portions of the document, where another keyboard character set was required, provision was made for a change of the keyboard and a format change. One problem with the OS/6 System was that an operator had to either find and inspect the prior format or had to remember the identification of the active input keyboard in order to know what key to press for inclusion in the text of a given desired graphic.

Further, the 6-byte sequences utilized in the OS/6 made for an inefficient use of storage for words or phrases, especially in limited areas such as margin text.

Further, if the operator changed the keyboard specified in the master format or in a format change, the printed/displayed text would also change, since the internal code points were not retranslated. The same result would take place if a block of text were moved to a section of the document keyed under a different format.

(b) The IBM 5520 System eliminated some of the above problems attendant the OS/6 System by adopting specific EBCDIC codes as its internal text representation. This required each point to be self-defining. Thus, keyboarding was strictly an input function and the data steam was independent of the active input keyboard. At any time, the operator could change the input keyboard without affecting the existing text. However, the IBM 5520 approach involved difficulty in communicating with other devices such as the OS/6 System.

OBJECTS OF THE INVENTION

It is accordingly an object of the present invention to further facilitate the correction of texts that have been input by way of keyboard to storage preparatory to hard copy printout or other display.

It is a further object of this invention to provide for keyboard mismatch correction to facilitate the insertion of text or other graphics into a data system previously entered into storage by way of keyboard input.

SUMMARY OF THE INVENTION

These and other objects and advantages are achieved with the present method and apparatus. Briefly, there is provided a word processor wherein a text stream, input by way of a keyboard, is stored and is displayed to an operator. Different keyboard character sets are identified as available for use upon keyboard select commands. In accordance with the invention, means are provided for signalling the location at which an insert of one or more characters is to be added to the data stream. Means are provided to compare (a) the active document keyboard character set with (b) the unique input keyboard character set to produce a first output if the compared sets are the same and to produce a second output if the compared sets are different. Means are provided responsive to the first output to direct the insert into the text stream without the addition of character set change codes. Means responsive to the second output enter a character set change code immediately upstream of said location to indicate the keyboard character set of said insert, then the insert is entered and a further character set change code is entered, if necessary, immediately downstream of said insert to indicate the keyboard character set for the downstream text.

BRIEF DESCRIPTION OF THE DRAWINGS

The foregoing and other objects, features, and advantages of the invention will become apparent from the following, more particular description of a preferred embodiment, as illustrated in the accompanying drawings wherein.

DESCRIPTION OF THE PREFERRED EMBODIMENT

Figure 1:
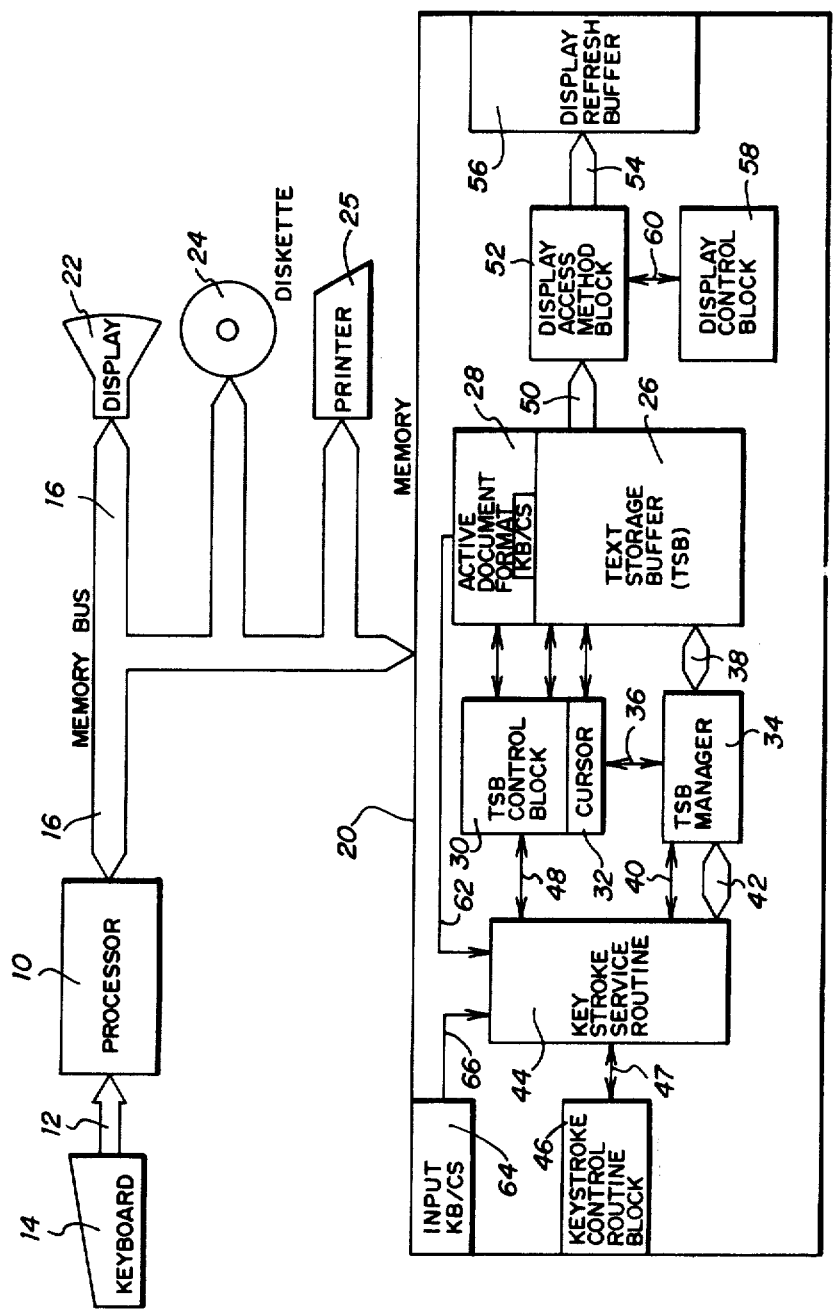
FIG. 1 is a block diagram of the system embodying the present invention.

Referring now to FIG. 1, a portion of the text processing system is shown, including a processor 10 to which is connected a bus 12 leading from a keyboard 14. Character data generated by manual actuation of keyboard 14 applies character-related signals to processor 10 which provides on an output memory bus 16 a data stream which the characters selected by actuation of keyboard 14 appear suitably encoded.

Memory bus 16 extends to a memory unit 20, to a display unit 22, to a diskette unit 24 and to a printer 25.

Memory 20 includes a text storage buffer 26 which serves to store the coded data stream comprising the text input through the keyboard 14. Included in the text storage buffer 26 is a storage section for the identity of the active document format which contains the active document keyboard character set namely, in portion 28.

A text storage buffer control block 30 is linked to buffer 26 and includes a cursor control section 32.

A text storage buffer manager 34 is linked by channel 36 to the control block 30, by channels 38 to the buffer 26 and by channels 40 and 42 to a keystroke service routine section 44.

A keystroke control routine block 46 is provided for the keystroke service routine section 44 to select the appropriate routine for the entered keystroke. The control block 30 is connected to section 44 by channel 48. Buffer 26 is coupled by channel 50 to a display access method block 52 which is coupled by way of channel 54 to a display refresh buffer 56. A display control block 58 is coupled by channel 60 to the display access method block 52.

In accordance with the present invention, a channel 62 is connected from the active document format storage 28 of buffer 26 to the keystroke service routine section 44. Further, an input keyboard character set (KB/CS) block 64 stores the identity of any desired input keyboard character set of keyboard 14 and is connected by way of channel 66 to the keystroke service section 44.

The display access method block has corresponding access method blocks for the diskette 24 and printer 25. Each of the blocks serves as an interface to the corresponding unit.

The display refresh buffer 56 contains the actual text which is shown on display 22 while the buffer 26 contains all of the display text plus control data.

In operation of the system of FIG. 1, the encoded data stream on memory bus 16 is stored in the text storage buffer 26. In the process of correction and editing, the contents of the text storage buffer 26 i.e., selected portions or lines of a page, are presented on display unit 22. Stored in active document format section 28 is the code designating the keyboard character set that was employed in the production of the coded data stream appearing on memory bus 16 leading from processor 10 and applied from text storage buffer 26 to display unit 22 for edit.

If it is necessary, for example, to insert a graphic item into the text displayed on unit 22, then the present invention is employed. A cursor, conventionally available on such display systems, is placed below the character on display 22 at the location immediately preceding which an insert is to be made. The input keyboard character set identification of which the graphic item to be inserted forms a part, is applied by way of channel 66 to the keystroke service routine section 44 then which causes a comparison between the identification of the input keyboard character set stored in block 64 and the active document format keyboard character set in storage 28.

If, as a result of the comparison, it is found that the keyboard character sets are the same, then the desired insert graphics are input through keyboard 14. The insert will appear at the selected location without the need for inserted character set change codes.

If, as a result of the comparison, it is found that the input keyboard character set stored by block 64 differs from the active document format keyboard character set in storage 28, then a character set change code for the input keyboard character set is inserted by the keystroke service routine into the data stream immediately ahead of the location of the cursor and a second character set change code following the first code is inserted in the data stream designating the active document format keyboard character set as stored in storage 28. The graphics desired are then inserted between the character set change codes.

Figure 2:
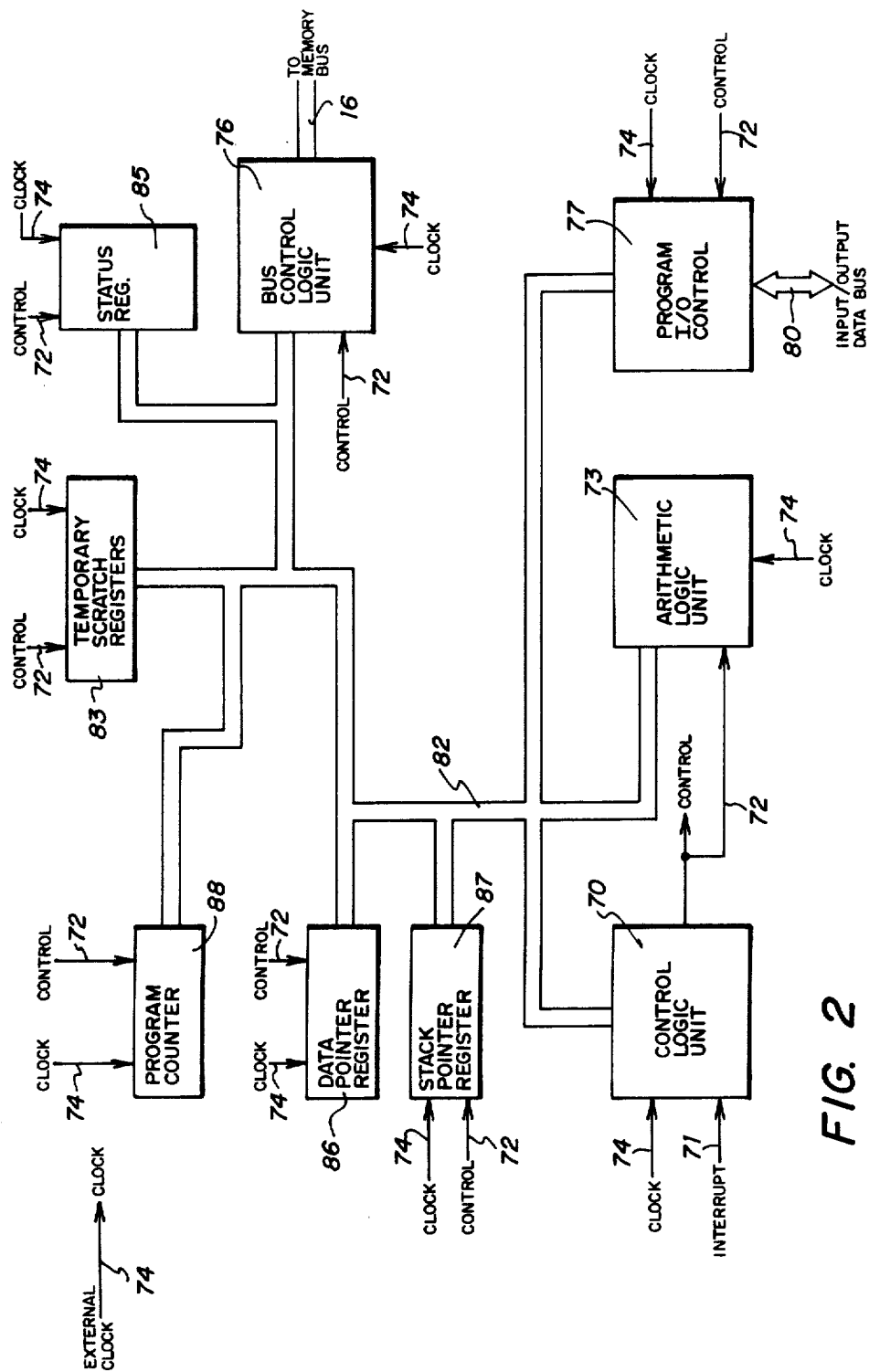
FIG. 2 is a block diagram of the processor shown in FIG. 1.

Referring to FIG. 2, the processor 10 is further detailed to show typical logic hardware elements as found in such processors. The processor may be a commercially available unit, such as from Intel Corporation and identified by the number 8086. Typically the processor includes a control logic unit 70 which responds to interrupts on a device buss 71 from the keyboard 14. The control logic unit 70 is also connected to a data and address bus 82 interconnected to various other logic units of the processor 10.

In response to a fetch instruction from the random access memory 20, the control logic unit 70 generates control signals to other logic elements of the processor. These control signals are interconnected to the various elements by means of a control line 72 which is illustrated directly connected to an arithmatic logic unit 73 and identified as a "control" line 72 to other elements of the processor. Synchronous operation of a control unit 70 with other logic elements of the processor 10 is achieved by means of clock pulses input to the processor from an external clock source on a clock line 74. Line 74 is also known interconnected to other logic elements of the processor 10 detailed in FIG. 2.

Data and instructions to be processed in the processor 10 are input through a bus control logic unit 76. Data to be processed may also come from program input/output control logic unit 77. The bus control logic 76 connects storage elements of the random access memory 20 and receives instructions for processing data received from the input/output control 77 or received from the random access memory 20. Thus, the input/output control 77 receives data from the keyboard 14 or the random access memory 20 while the bus control logic 76 receives instructions and/or data from the same memory. Note the different storage sections of the random access memory 20 identifiable for instruction storage and data storage.

Device control information from the processor 10 is output through the program input/output controller 77 over a data bus 80. Input data on the data bus 80 from the keyboard 14 is processed internally through the processor by instructions on the bus 82 to temporary scratch registers 83. The arithmetic logic unit 73, in response to a control signal on line 72 and in accordance with instructions received on input/output data bus 80, performs computations and the results can be stored in the temporary scratch registers 83. Various other tranfers of data between the arithmetic logic unit 73 and other logic elements of the processor are of course possible. Such additional transfers may be to a status register 85, data pointer register 86 or a stack pointer register 87. A program counter 88 is also connected through the data stream bus 82 to various other logic elements in the processor 10.

A particular operating sequence for the processor 10 is determined by instructions and data on the memory bus 16 and input data on the bi-directional bus 80. As an example, in response to received instructions, the processor 10 transfers data stored in the scratch registers 83 to one of the registers 85, 86 or 87. Such operations of processors as detailed in FIG. 2 are considered to be well known and understood by one or ordinary skill in data processing field. A detailed description of each operation of the processor in FIG. 2 is not deemed necessary for a full understanding of the present invention as claimed.

Figure 3:
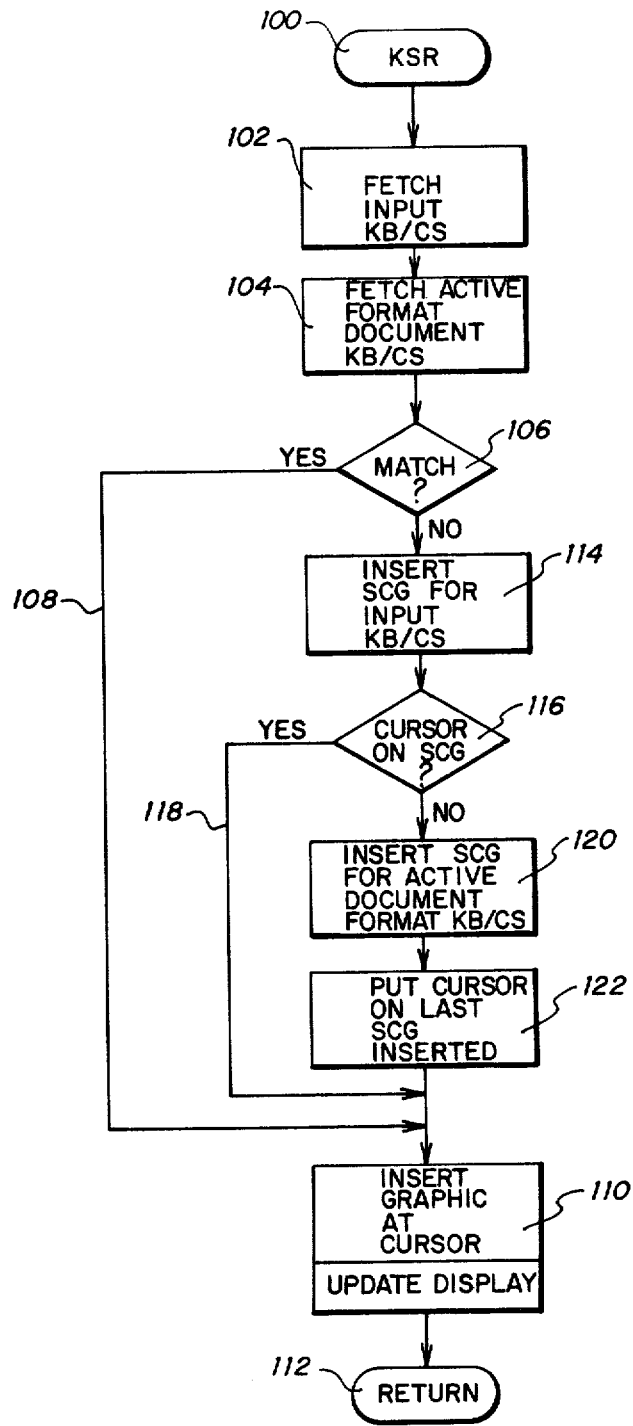
FIG. 3 is a flow diagram indicating the sequence of operations in the system of FIG. 1.
Figure 4:
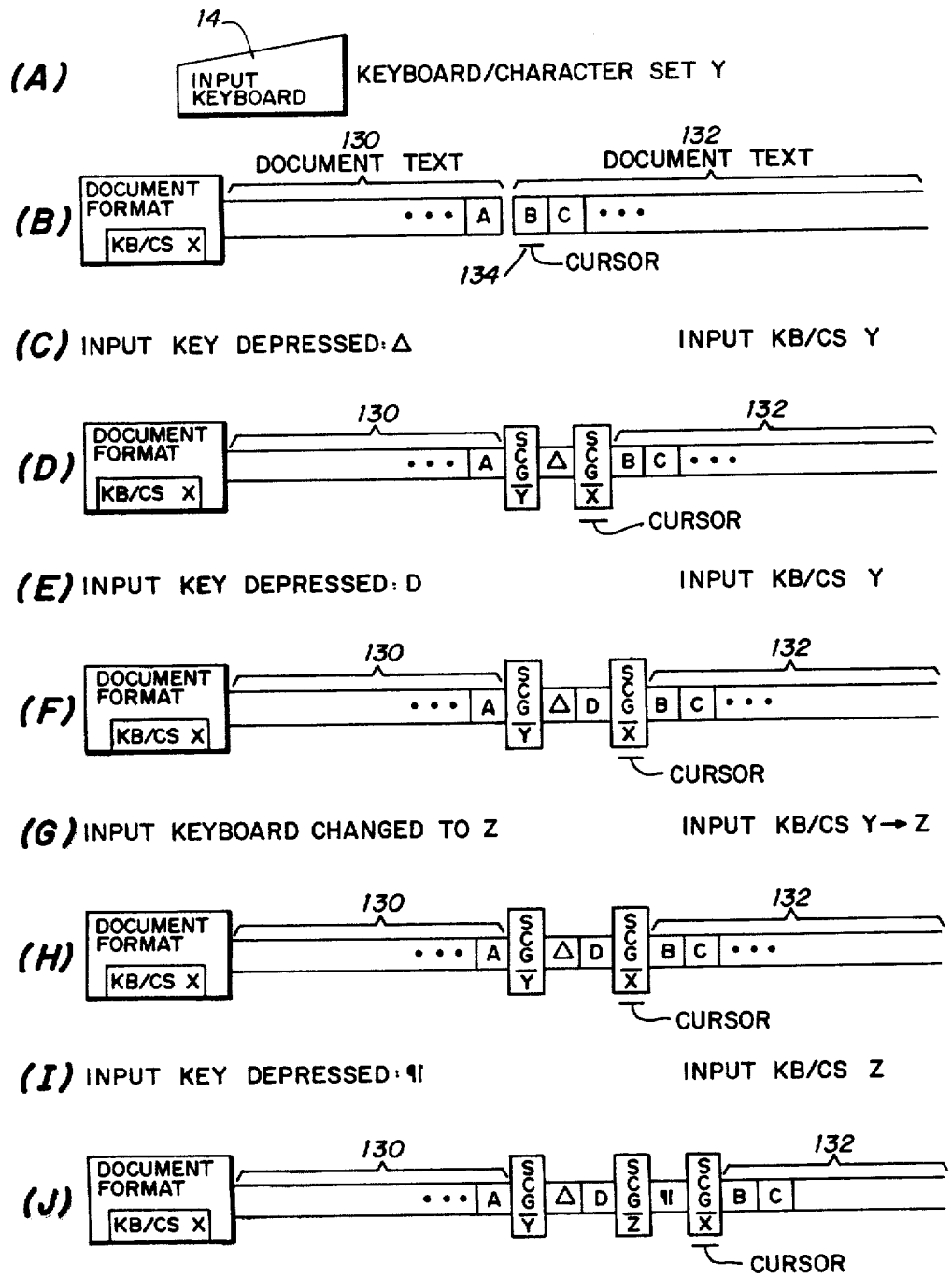
FIG. 4 illustrates a series of steps involved in the operations depicted in FIG. 2.

In FIG. 3, a flow chart illustrates the steps followed in the keystroke service routine (KSR) section 44 of FIG. 1 for graphic insertion operations.

The keystroke service routine desired for graphic insertion utilizes service routines stored in the text storage buffer manager 34. The KSR routine 100 involves a first step 102 in which the code for the input keyboard character set is fetched from storage block 64. Next, the active document format keyboard character set is fetched from storage block 28. The two sets are then compared in step 106. If they are the same, then, as indicated by a first output link 108, the graphic character is merely inserted ahead of the cursor location as indicated in step 110. This updates the display, following which the system returns to the start condition, as indicated by step 112.

If, in the comparison step 106, it is found that the input keyboard character set and the active document format keyboard character set differ, then a second output link is taken to step 114 where a character set code (SCG) is inserted in the data stream for the input keyboard character set. Next, a check is made to see if the cursor is at the location in the data stream at which the active document format keyboard character set change code had previously been inserted as indicated by step 116. If the cursor is at the code location, then the graphic is inserted as indicated by link 118.

If a comparison in step 116 is negative, then a code for the active document format keyboard character set is inserted after the code previously inserted for the input keyboard character set as indicated in step 120. The cursor is then placed on the last inserted keyboard character set change code SCG, namely, the active document keyboard format character set as indicated in step 122. Thereupon, the desired graphics are inserted, as indicated in step 110, to update the display. The system is then returned to its normal state.

As the process described in reference to FIG. 3 is repeated there may be the occurrence of contiguous character set change codes in the text stream. Should this occur, the upstream character set change codes are deleted leaving the last downstream code.

The system and examples of its operation are further illustrated by the steps depicted in FIGS. 4A–J. Step 4A indicates that the input keyboard 14 is to be used to insert a graphic character based upon a keyboard character set Y.

Step 4B illustrates a portion of the data stream that has been input in the document format keyboard character set X. By way of example only, keyboard character set X may include standard alphanumeric symbols while keyboard character set Y may contain "greek" alphabet symbols. The insert location in the data stream appearing on display 22 is at a point between the characters A and B, between the document text segments 130 and 132. Preparatory to such insertion, the cursor 134 is manipulated by the operator to a location under the character B. In step 4C the operator depresses an input key for a graphic symbol, for example, Δ, which is one of the symbols in set Y and not in set X.

Step 4D indicates that the symbol Δ has been inserted into the data stream between the SCG code for the keyboard character set Y and the SCG code for the keyboard character set X. In step 4E, manual depression of, for example, the key D in the input keyboard character set Y results in step 3F, wherein the symbol D is inserted into the document stream after the symbol Δ.

It will be noted that the data stream signal 132 is shifted from one step to the right from the locations in step 4B to the locations in steps 4D and 4F. That is, the codes and desired graphics are inserted into the stream and the rest of the stream is shifted downward.

Step 4G indicates that the input keyboard is changed to keyboard character set Z, which by way of example only, may include text processing symbols.

As indicated in step 4H, no codes are inserted into the data stream at this point since no graphic is inserted when changing the input keyboard character set from Y to Z.

However, as indicated in step 4I, if the input key is depressed to insert, for example, ¶, as found only in keyboard character set Z, then, as indicated in step 4J, the symbol ¶ is inserted into the data stream, along with the code for the keyboard character set Z immediately preceding the symbol ¶. Again, the cursor is shifted downstream, along with the rest of the data stream. Two more symbol slots accommodate the keyboard character set SCG code Z and the desired graphic symbol ¶. Note that another SCG code was not inserted after the symbol ¶ since the cursor was already on an SCG code.

When the keyboard character set change code is encountered and one of the following characters is not on the print head during a print operation, the printer is stopped and the operator is alerted to change the print head for the new character set. The operator must make such a change whenever there is a character in the data storage set not included on the installed print head.

Although one embodiment of the invention has been illustrated in the accompanying drawings and described in the foregoing Description of the Preferred Embodiment it will be understood that the invention is not limited to the embodiment disclosed, but is capable of numerous rearrangements, modifications and substitutions without departing from the scope of the invention.

What is claimed is:

1. In a word processor where a text stream input by way of the keyboard is stored and displayed to an operator and wherein different keyboard character sets are available for use, the combination which comprises:

means for signalling the location at which an insert character is to be added to said text stream, said insert character belonging to an input keyboard character set defined by an input keyboard character set code;

means for comparing said input keyboard character set code with an active keyboard character set code identifying an active keyboard character set employed to produce said text stream immediately preceding said location to produce a first output when said character keyboard set codes are the same and a second output when said character keyboard set codes are not the same;

means for entering said insert character at said location in response to said first output; and means responsive to said second output for adding a character set change code immediately upstream of said location in said text stream to indicate the keyboard character set for said insert character at said location, for entering said insert at said location, and for adding a character set change code immediately downstream of said insert in said text stream for defining the keyboard character set to be used to produce the text stream subsequent to said insert.

2. The combination recited in claim 1 including means for deleting all but the last of contiguous character set change codes in said text stream.

3. The combination recited in claim 1 including printer means responsive to said second output from said means for comparing for signalling to said operator that the printer means does not have a print head for printing a character received in said text stream.

4. In a word processor where a text stream input by way of a keyboard is stored and is displayed to an operator and wherein different keyboard character sets are available for use, the method comprising the steps of:

signalling the location at which an insert character is to be added to said text stream, said insert character belonging to an input keyboard character set defined by an input keyboard character set code;

comparing said input keyboard character set code with an active keyboard character set code identifying an active keyboard character set employed to produce said text stream immediately preceding said location to produce a first output when said keyboard character set codes are the same and a second output when said keyboard character set codes are not the same;

entering said insert character at said location in response to said first output;

in response to said second output, adding the character set change code immediately upstream of said location of said text stream to indicate the keyboard character set for said insert character;

entering said insert at said location; and adding a character set change code immediately downstream of said insert in said text stream for defining the keyboard character set to be used to produce the text stream subsequent to said insert character.

5. The method recited in claim 4 including the step of deleting all but the last of contiguous character set change codes in said text stream.

* * * * *